June 20, 1967  J. F. GARRISON  3,327,270
SEMI-CONDUCTOR SENSING ASSEMBLY
Filed Jan. 6, 1965
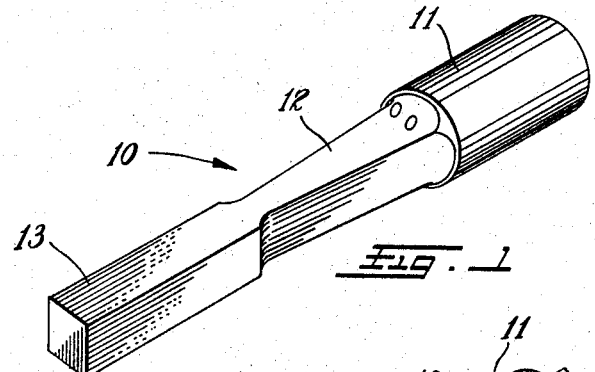
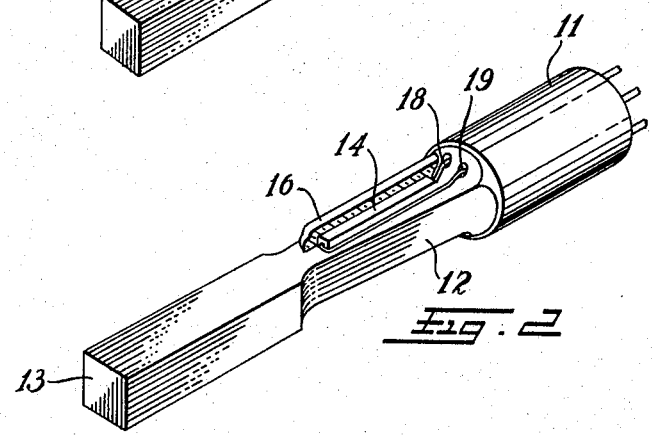
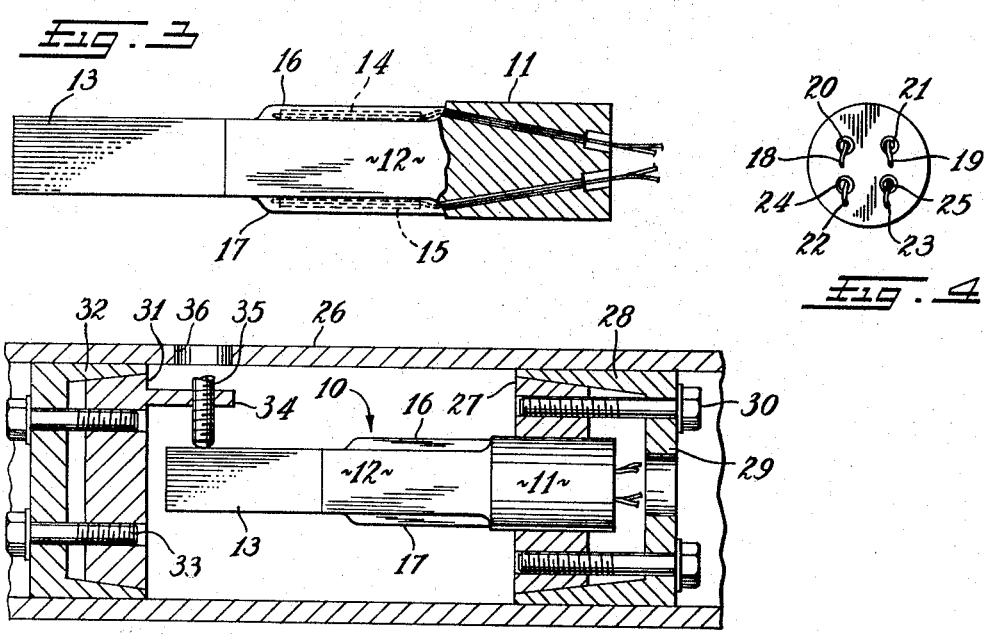

3,327,270
SEMI-CONDUCTOR SENSING ASSEMBLY
Judd Fredrick Garrison, Grand Rapids, Mich., assignor to Pneumo Dynamics Corporation, Cleveland, Ohio, a corporation of Delaware
Filed Jan. 6, 1965, Ser. No. 423,732
3 Claims. (Cl. 338—2)

This invention relates to a force sensing assembly particularly suited for use in integral aircraft weight systems and other environments in which semi-conductor sensors are subjected to rigorous operating conditions.

It is a primary object of the present improvements to provide such a sensing assembly which is distinguished both by its accuracy and reliability under extreme load applications and the like which have precluded the use of more conventional transducers of the class capable of producing or influencing an electrical signal proportional to force deformation or deflection. The most commonly used sensor of this type has been the wire strain gauge and such components with related systems have been very highly developed in respect of accuracy of results under normal environmental demands for strength and attrition of performance over practical periods of useful life. These gauges are, however, inherently fragile and are simply unable to resist more or less excessive loading, shock, and the like found unavoidably in many systems, such as the integral system noted for the weighing of aircraft. This particular system provides a good illustration of the degree of ruggedness required of the sensing assembly utilized, with this being well beyond the capabilities of known wire strain gauge assemblies.

The aircraft weight system thus employs a plurality of selectively located transducers within parts of the craft at which the weight will, when the aircraft is on the ground, produce a structural stress capable of being proportionately related to the load as thus detected at the particular location. Such systems have incorporated transducer devices for this purpose within the landing gear, and it will be at once apparent that the normal use of the aircraft will subject the gear and hence the transducers to repeated excessive impact or shock as the result of landings, with this value of course being considerably in excess of the static weight of the craft when on the ground. Other types of transducers which would be more rugged in the physical sense are not considered to have the necessary accuracy of performance upon which the useful operation of the entire system depends.

The semi-conductor sensing assembly of the present invention, as above noted, avoids such disabilities and it is a further object to provide by this invention such an assembly in which the semi-conductor elements are so incorporated therein as to substantially eliminate or protect against the adverse effects of hysteresis and other factors, such as temperature influence, which could be responsible for significant system error.

Another object of the invention is to provide a semi-conductor sensing assembly in which a known pre-load is imposed upon the structure in order that the force to be measured when applied has the effect of proportionately relieving the initial set load, the relationship being linear and this pre-loading feature protecting against damage due to excessive loading such as occurs in the aircraft environment discussed upon landing.

Other objects and advantages of the present invention will become apparent as the following descrpition proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective view of a cantilever beam which is used as the transducer support in the new sensor assembly;

FIG. 2 is a similar perspective view in which there is an attached semi-conductor with encapsulation for the latter shown partly in longitudinal section;

FIG. 3 is a side elevation of the fully assembled beam, with an end portion in longitudinal section to illustrate certain inner formations;

FIG. 4 is an end view of the FIG. 3 beam as viewed from the right in such last figure; and FIG. 5 is a side elevation of the sensor assembly cradle-mounted within a structural member and showing representative mounts and pre-load devices, with the latter in longitudinal section.

Referring now to the drawings in detail, the illustrated embodiment of the invention is designed especially for use in an integral aircraft weighing system wherein it would be disposed within the interior of a landing gear axle or hinge pin. It will be appreciated that some modifications may be needed to adapt the assembly to mounting in other structure, particularly in the detailed design of the supporting and locking members to accommodate the particular environment, but the principles even in respect of the nature of the mounting will be the same as those to be described in reference to the illustrated embodiment.

The new sensing assembly comprises a beam designated generally by reference numeral 10 adapted to be mounted as a centilever subject to bending along its length in a manner to be explained more fully below. This beam has a cylindrical end portion 11, which in operation constitutes the anchor or fixed end of the beam, an intermediate body section 12 which is tapered as most clearly shown in FIG. 1 outwardly or in a direction away from the end portion 11, and a distal end portion 13. The taper of the intermediate section 12 is such that the top and bottom surfaces are of gradually decreasing width in proceeding along the section from the fixed to the free end of the beam, with this taper uniform throughout the height or thickness. The beam is intended to bend or deflect lengthwise, and the noted taper has the advantage of providing uniform bending stress over the length of the section 12. The thickness of the bar can and will vary depending upon the particular use in terms of the deflection to be experienced in a particular environment, and it is preferred that the bar be made of a material which will exhibit negligible hysteresis. An example of a preferred material is an isoelastic steel alloy exhibiting minimal hysteresis when compared, for example, to conventional spring steel alloys.

A first solid semi-conductor strip 14 is disposed against the top surface of the tapered section 12 to extend therealong, and a second similar strip 15 of solid semi-conductor material is arranged in like manner against the bottom surface of this section. These semi-conductors are preferably monocrystalline silicon, which is an available piezoresistive material having an extremely high accuracy in exhibiting a change in resistance as a result of tension and compression. Moreover, this type of element is free of hysteresis and has extremely good temperature stability. The two such silicon bars 14 and 15 are actually fused to the cantilever beam by encapsulation in place thereon with fused glass, such bodies of encapsulating material being indicated respectively at 16 and 17. The surfaces of the bar section 12 against which the semi-conductors are thus applied are given an initial fired coating to enhance the bonding of the encapsulating glass when fired, and such initial coating also serves effectively to isolate the semi-conductors from the bar itself; that is, the coating is applied even before the placement of the bars 14 and 15. The use of the silicon for the semi-conductor material permits this type of extremely good bonding and encapsulation, since it is a material which can withstand the high temperatures needed for fusion of the glass without damage or impairment of the desired operating characteristics of the material.

The top semi-conductor strip 14 has connected thereto at its respective ends, electric wires 18 and 19, and these wires proceed from the encapsulation rearwardly through inwardly inclined passages 20 and 21 provided for the purpose in the end portion 11 of the beam. The bottom semi-conductor strip 15 has similar electric wire connections 22 and 23 proceeding in like manner through corresponding beam passages 24 and 25, with all of these wires being thus brought to this end face of the beam for connection in an external circuit. It will be noted that the wires enter the beam from within the encapsulating bodies about the semi-conductors and they are thus fully enclosed and protected to the emergence at the end face.

The manner in which this sensing assembly is operatively located in structure in which the stress to be measured occurs is illustrated in simplified fashion in FIG. 5, with the assembly here shown in association with a hollow cylindrical member 26 which can, for example, represent an aircraft axle. The arrangement of the sensor provides, in effect, a cradling of the cantilever beam 10 internally of the structural member 26, it being understood that the latter is representative of an environment in which bending may occur and is to be measured by means of the sensing assembly. It will thus be seen that the end portion 11 of the beam 10 is received within a cam disc 27 having an outwardly inclined peripheral wall in engagement with a correspondingly sloped inner wall of an outer locking and camming sleeve 28. The outer surface of the member 28 is cylindrical and in contact with the interior surface of the hollow cylindrical member 26, with such outer piece having an inturned flange 29 at its outer end through which a plurality of machine screws 30 pass into threaded engagement with the inner cam 27. Actuation of the screws 30 thereby causes relative axial movement between the members 27 and 28, and the latter can be slotted for expansion against the inner wall surface of the member 26 as a result of the cam action produced by this actuation in order firmly to hold the sensor assembly in the operative condition illustrated.

At the other end 13 of the thus mounted cantilever beam, there is a similar assembly of inner and outer cams 31 and 32 respectively like the previously described pieces 27 and 28. Moreover, the actuation of this device is accomplished in the same manner by machine screws 33 as in the first noted assembly. In this device, however, the inner cam 31 has a longitudinal projection 34 at its inner face extending over the end portion 13 of the cantilever beam 10. An adjusting screw 35 is threaded downwardly through this cam projection 34 against the end portion 13 of the beam 10, with an access opening 36 being shown provided in the structural member 26 to facilitate external application of a suitable tool for advancing and retracting the adjusting screw 35. As will be apparent, this adjusting screw will provide the controlled pre-load to the degree determined necessary and desired for the particular environmental conditions to be experienced as earlier discussed.

It will be understood that the pre-loading mechanism also can assume many different forms, and it is significant here only to note that the pre-load should be controllable and, of course, applied in such a direction that the force operatively acting on the beam and to be measured is effective proportionally to relieve the pre-load. In other words, the force, such as that attributable to weight in the aircraft weighing system earlier mentioned, is transmitted to the cantilever beam in a direction having the result of relieving the stress initially established by the pre-load device. In the illustrated assembly the semi-conductor strips will be seen to extend generally at right angles to the direction of application of the initial fixed load. The general nature of the mounting for the cantilever preferably provides the type of cradle support illustrated and described according to the here-indicated desired mode of operation.

It is contemplated that these semi-conductor elements will be energized and connected in a bridge network external of the assembly and that there will accordingly be a transduced electrical signal derived which is applied for measurement of the load induced stress. This signal will actually represent diminishment in view of the pre-loading as set forth above, and the thus derived signal is of course employed suitably to provide a weight reading, for example, in a relative simple associated computer. Such a system can, as is commonly understood, also include if necessary or desired, suitable added temperature compensating components, and it is possible that these might be included in direct physical association with the cantilever beam.

The glass encapsulation of the silicon bars both eliminates creep and establishes an ideal environmental protection for the elements, whereby they are free from potentially disturbing operational influences in respect of temperature, humidity, dust, fungus and the like. The separation of the two bars, by the opposite surface placement thereof described, and the arrangement of their respective connections is also advantageous, since the possibility of interference and shorting is substantially avoided. As noted earlier, the tapered shape is an ideal cantilever, and the fully constructed sensor can be further protected by being potted with silicon rubber or the like.

Other modes of applying the principle of the invention may be employed, change being made as regards the details described, provided the features stated in any of the following claims or the equivalent of such be employed.

I, therefore, particularly point out and distinctly claim as my invention:

1. A semi-conductor sensing assembly, comprising mounting structure, a cantilever beam made of a low hysteresis steel having a cylindrical end portion gripped and thereby fixed in said mounting structure, the other end being free, said beam having a longitudinal section which is tapered uniformly through its thickness to provide opposed surfaces of gradually reducing width in proceeding along said section in a direction from the fixed to the free end of the beam, a solid semi-conductor bar arranged to extend along each of said opposed surfaces of the beam, the semi-conductor bars being sealed within encapsulating material serving also to bond them in isolated relation to such opposed surfaces, electric wires connected to the ends of the semi-conductor bars for connection thereof in an external circuit, said wires proceeding from the encapsulating material without exposure through individual interior passages formed in the fixed end of said beam and leading to a removed portion where the wires exit for the external connections of the same, the semi-conductor when thus connected and energized being operable to produce an electrical signal in proportional response to bending of said beam, and means for applying a predetermined constant force tending to bend the beam for pre-loading thereof in a direction such that the force separately applied for measurement has the effect of reducing such pre-load.

2. A semi-conductor assembly as set forth, in claim 1 wherein the encapsulating and bonding material is glass.

3. A semi-conductor assembly as set forth in claim 2 wherein the semi-conductor bars are made of silicon.

(References on following page)

References Cited

UNITED STATES PATENTS

| | | | |
|---|---|---|---|
| 2,457,616 | 12/1948 | VanDyke et al. | 338—2 |
| 2,508,419 | 5/1950 | Ramberg | 338—2 X |
| 2,544,738 | 3/1951 | Tint | 338—5 |
| 2,569,714 | 10/1951 | Gregory | 338—2 |
| 2,630,007 | 3/1953 | Howe et al. | 73—88.5 |
| 2,802,925 | 8/1957 | Von Seelen et al. | 338—28 |
| 2,901,905 | 9/1959 | Horst | 73—1 |
| 3,022,672 | 2/1962 | Dimeff et al. | |
| 3,023,627 | 3/1962 | Geyling. | |
| 3,034,345 | 5/1962 | Mason. | |
| 3,084,300 | 4/1963 | Sanchez | 338—2 |
| 3,161,061 | 12/1964 | Ames. | |
| 3,205,464 | 9/1965 | Schwartz | 338—6 X |

OTHER REFERENCES

"Design and Performance of a Thrust Transducer," by Toren E. Bollinger, ISA Journal, August 1956, pp. 260–264.

"Resistance Wire Strain Gage Equipment for Static and Dynamic Testing," Product Engineering, W. F. Gunning and E. C. Van Leeuwen, September 1945, pp. 608–613.

"Strain Gauge Calibration Device for Extreme Temperatures," R. M. McClintoch, the Review of Scientific Instruments, vol. 30, No. 8, August 1959, pp. 715–718.

RICHARD M. WOOD, *Primary Examiner*.

W. D. BROOKS, *Assistant Examiner*.